(12) United States Patent
Weimer

(10) Patent No.: US 6,787,959 B2
(45) Date of Patent: Sep. 7, 2004

(54) ELECTRICAL MACHINE AND ELECTRICAL SYSTEM

(75) Inventor: Jürgen Weimer, Euerbach (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/957,957

(22) Filed: Sep. 21, 2001

(65) Prior Publication Data

US 2002/0047451 A1 Apr. 25, 2002

(30) Foreign Application Priority Data

Sep. 21, 2000 (DE) .......................................... 100 46 729

(51) Int. Cl.[7] .................................................. H02K 1/00
(52) U.S. Cl. ........................ 310/184; 310/198; 290/46; 290/31; 290/36 R
(58) Field of Search ................................ 310/184, 198, 310/71, 260, 113, 179–208; 290/46–48, 31, 32, 36 R, 38 R, 179 PO, 208

(56) References Cited

U.S. PATENT DOCUMENTS

| | | | | |
|---|---|---|---|---|
| 2,874,309 A | * | 2/1959 | Staak ........................ 290/38 A |
| 3,107,540 A | * | 10/1963 | Curriston ...................... 74/5.4 |
| 3,793,544 A | * | 2/1974 | Baumgartner et al. ....... 320/123 |
| 4,045,718 A | * | 8/1977 | Gray ........................... 320/123 |
| 4,138,629 A | * | 2/1979 | Miller et al. ................. 318/140 |
| 4,163,187 A | * | 7/1979 | Thomas ......................... 322/29 |
| 4,739,204 A | * | 4/1988 | Kitamura et al. .......... 310/68 D |
| 5,015,904 A | * | 5/1991 | Kleemann .................... 310/184 |
| 5,139,397 A | | 8/1992 | Strelow .................... 417/423.5 |
| 5,196,752 A | * | 3/1993 | Palma ........................ 310/260 |
| 5,424,599 A | * | 6/1995 | Stroud ........................ 310/198 |
| 5,828,147 A | * | 10/1998 | Best et al. .................... 310/71 |
| 5,900,687 A | * | 5/1999 | Kondo et al. ................. 310/71 |
| 5,994,802 A | * | 11/1999 | Shichijyo et al. ............. 310/51 |
| 6,011,339 A | * | 1/2000 | Kawakami ................... 310/208 |
| 6,034,456 A | * | 3/2000 | Osama et al. ............... 310/90.5 |
| 6,040,634 A | | 3/2000 | Larguier ...................... 290/45 |
| 6,091,172 A | * | 7/2000 | Kakinuma et al. ............ 310/71 |
| 6,369,473 B1 | * | 4/2002 | Baumeister et al. .......... 310/71 |
| 6,462,429 B1 | * | 10/2002 | Dhyanchand et al. ......... 290/31 |

FOREIGN PATENT DOCUMENTS

| | | |
|---|---|---|
| DE | 198 50 818 | 5/2000 |
| DE | 199 13 450 | 9/2000 |
| DE | 199 20 127 | 11/2000 |
| FR | 1 349 533 | 4/1974 |
| JP | 9331694 | 12/1997 |
| JP | 2000175420 | 6/2000 |

OTHER PUBLICATIONS

International Search Report, Aug. 8, 2001 For 100 46 729, 6–32.

Cengelei E et al., "A New Modular Motor—Modular Inverter (MM–MI) Concept For Medium Voltage Adjustable Speed Drive Systems" Conference Record of the 1999 IEEE Industry Applications Conference, vol. 3., Oct. 1999, pp. 1972–1979.

* cited by examiner

Primary Examiner—Dang Le
(74) Attorney, Agent, or Firm—Cohen, Pontani, Lieberman & Pavane

(57) ABSTRACT

An electrical machine with a stator component and a rotor component, wherein the stator component carries the winding of the electrical machine, which has a number of coils. An electronic power unit is provided to control the electrical machine. To obtain an electrical machine, which has a long service life but does not occupy much space, the stator component has two or more separate windings to form two or more electrical sub-machines. The electrical machine can be used to advantage as a starter-generator in commercial vehicles and busses. An improved electrical system is also described.

26 Claims, 9 Drawing Sheets

ELECTRICAL MACHINE AND ELECTRICAL SYSTEM

BACKGROUND OF THE INVENTION

1. Field of the Invention

The present invention pertains to an electrical machine of the type having a stator component and a rotor component, where the stator component has a winding with a plurality of coils and having an electronic power unit for controlling the machine. The invention also pertains to an electrical system with an on-board network including such an electrical machine.

2. Description of the Related Art

Electrical machines are usually rotating machines, which use a magnetic field to convert electrical energy into mechanical energy according to the motor principle or to convert mechanical energy into electrical energy according to the generator principle.

Electrical machines of this type, which can be designed as synchronous or asynchronous machines, for example, have an electrical assembly which comprises a rotor component and a stator component. The stator component is usually the stationary part, whereas the rotor component is the rotating part. Depending on the design of the electrical machine, the stator component consists, for example, of a stack of metal plates, forming a yoke and a number of teeth. In the slots between these teeth, an electrical winding is provided, which consists of a number of coils. When current flows through this winding, it produces the magnetic field of the electrical machine. The rotor component consists, for example, of a stack of plates, on which a number of magnets, possibly permanent magnets, are mounted. Electrical machines of the type indicated are in widespread use in the state of the art and have many different applications.

The electrical assembly of the electrical machine is usually contained inside a housing, which protects it from external influences and damage.

When the electrical machine is used in, for example, the drive train of a vehicle, it can function as a so-called "starter-generator". A starter-generator is, for example, a synchronous machine with permanent excitation, which is installed in the drive train between the crankshaft of the internal combustion engine and the clutch or transmission. The starter-generator can be used to start the internal combustion engine, for example. In addition, while the vehicle is traveling, the starter-generator can also function as a generator and can therefore replace the starter and the generator in the vehicle. The housing of the starter-generator can be connected to the internal combustion engine or to the transmission.

Starter-generators of this type have been used for some time in passenger vehicles. There is now a tendency, however, to use starter-generators in commercial vehicles and busses and the like. In contrast to passenger vehicles, the required service life for starter-generators in commercial vehicles and busses is extremely long. In addition, the required reliability is also much higher than it is in the case of passenger vehicles.

In busses, for example, as also in the case of passenger cars, the power which the on-board network must handle has increased significantly in recent years. The reason for this is that, in addition to the normal electrical loads, new convenience functions are always being added. Examples which can be mentioned include air conditioners, galleys, televisions, new communications systems, and much more besides.

To supply power to these loads, up to four generators are currently being installed on the internal combustion engine. The generator in the on-board network of a bus, however, represents a weak link. It is true that, if a generator fails, the bus can still be driven without difficulty, because the loads will be handled by the other generators. To make this feasible, however, it is usually necessary to decrease the number of individual convenience functions. It can usually be guaranteed that the basic electrical components of an internal combustion engine such as the ignition system, electronic control devices, etc., will be supplied with the necessary power by the known system. When a generator fails, the bus is usually still able to return to its home base, even if it is on a long trip, so that the generator can be replaced at low cost by the bus company itself.

The components of a starter-generator system, however, also have only a limited service life. Therefore, it is not impossible that one of the individual components will fail during the extremely long useful life of a commercial vehicle or bus. Because only one starter-generator system is usually installed in an internal combustion engine, the failure of the starter-generator or of its electronic power unit would make it impossible for the commercial vehicle or bus to continue in operation. Whereas the electronic power unit can be replaced easily like a generator, this is not the case with a starter-generator machine. This reason for this is that the starter-generator machine is usually installed in the drive train of the vehicle, between the internal combustion engine and the clutch or transmission. Replacing the starter-generator is therefore very complicated and expensive.

SUMMARY OF THE INVENTION

Proceeding from the state of the art explained above, the present invention is based on the task of providing an electrical machine and an electrical system by means of which the disadvantages described above can be avoided. In particular, an electrical machine is to be provided which has a long service life and a high degree of reliability and which at the same time occupies only a small amount of space.

This object is accomplished by an electrical machine wherein the stator component has two or more separate windings, and by an electrical system with an on-board network having such an electrical machine. Additional advantages, features, details, and effects of the invention can be derived from the specification, and from the drawings. Advantages, features, and details of the invention which are described in conjunction with the electrical machine apply also to the electrical system and vice versa.

According to the first aspect of the invention, an electrical machine is provided, which has a stator component and a rotor component, where the stator component contains the winding of the electrical machine and has a number of coils. The machine also has an electronic power unit for controlling the electrical machine. In accordance with the invention the stator component contains two or more separate windings to form two or more electrical sub-machines.

Each winding includes a plurality of coils and a plurality of linking conductors connecting the coils, the coils of all of the windings being arranged in a single ring.

With the electrical machine according to the invention, it is possible to achieve a significant increase in service life and reliability in comparison with the technical solutions known from the state of the art. At the same time, the electrical machine occupies only a small amount of space, which means that it can be integrated very easily into the drive train of a vehicle. The electrical machine is also easy to install, requires only a small amount of material, and has simple logistics, as will be described in greater detail later in the specification. The electrical machine according to the invention is also more efficient than conventional electrical machines, has a smaller voltage dip on startup, and suffers fewer problems involving electromagnetic compatibility (EMC).

One of the basic ideas of the invention is that the electrical machine is in fact divided into two or more sub-machines without any change in the amount of space it occupies. For this purpose, two or more separate windings are provided on the stator carrier. Each winding is connected, controlled, and operated separately from each of the others. The electrical windings are therefore separated electrically from each other, so that each electrical winding, and therefore each electrical sub-machine, can be operated independently of each of the other windings or sub-machines. When one of the sub-machines fails, it is not necessary to replace the entire electrical machine, because the other sub-machines will take over the function of the failed sub-machine.

This will be explained on the basis of a concrete, nonexclusive example. When the electrical machine is to be used as a starter-generator in a commercial vehicle or bus, it is necessary to install multiple starter-generators to solve effectively the problems cited above associated with the state of the art. A simple "one-behind-the-other" installation of several electrical machines, however, is usually not possible for space reasons. A typical mechanism of failure in electrical machines is a short-circuit in the winding, which can come about, for example, as a result of the aging of the insulation or the like. Now, however, the electrical machine is designed with two or more independent windings, which are isolated from each other, so that, when one winding or one electrical sub-machine fails, there is still at least one intact winding or electrical sub-machine remaining.

The electrical machine thus has available at least one redundant component. This means that the electrical machine, depending on the number of separate windings, has at least one duplicate, so that, when one winding fails, the other winding or windings can take over the job and function of the failed one. As a result, the reliability and service life of the electrical machine is significantly increased.

In addition, the design of the electrical machine according to the invention also has the effect of increasing the power of the machine. When, for example, two independent windings are present on the stator carrier, one of these stator windings is only half as large as that of the known solutions, in which the stator contains only one winding but with a correspondingly larger number of coils. For this reason, the electrical machine designed in accordance with the invention has only half the inductance but twice the power. If more than two windings are provided, the power increases in a corresponding manner.

The invention is not limited to a specific number of independent windings on the stator carrier and thus to a specific number of electrical sub-machines. It is advantageous, however, for the electrical machine to have two or three independent windings. In this case, two or three electrical sub-machines can be or are realized in the electrical machine.

The invention is not limited to specific electrical machines. On the contrary, it can be used for all possible electrical machines. Examples which could be mentioned include electrical machines of the internal or external rotor type, synchronous machines, asynchronous machines, machines with permanent excitation, etc. A machine deserving of special mention is, for example, the starter-generator, which is especially suitable for motor vehicles. This is an electrical machine in which the rotors are supported, for example, via the crankshaft support of an internal combustion engine. The starter-generator is used not only for starting and stopping the engine but also for performing various other functions during the operation of the engine such as braking functions, booster functions, battery management, active vibration damping, synchronization of the engine, etc. A starter-generator of this type can be designed as a synchronous machine with either an external rotor or an internal rotor and can be connected, for example, by way of the stator carrier as a support to the engine block of the internal combustion engine.

The electrical machine according to the invention is controlled by at least one electronic power unit. An example of an electronic power unit of this type is described in U.S. Pat. No. 6,326,761, the disclosure of which is incorporated herein by reference. This electronic power unit consists of a power section, which has a number of capacitors and a number of power semiconductors. The capacitors and power semiconductors can be connected to a power bar. In addition, this electronic power unit has a control unit for the power section. A high-performance microcontroller, for example, is provided for control. In addition, a voltage supply is also provided. The electrical components connected to the voltage supply are controlled by the electronic power unit.

It is advantageous for the two or more windings to be connected on one side of the electrical machine. This allows the electrical machine to have a very simple design.

In a different design, the two or more windings can be connected on different sides of the electrical machine. This prevents the windings from touching each other at any point. This design variant is therefore especially reliable.

It is preferable for the connections of all the windings to be combined into a common connecting unit. It is also conceivable that the connections of each winding could be combined into their own separate connecting unit. The advantage of this is that it increases the reliability or safety of the electrical machine. If this is not required, all the connections can be combined into the a single connection unit, such as an appropriate terminal box.

In another embodiment, the individual windings can be connected by way of linking conductors. The linking conductors can be in the form of rings. In this case, the sub-coils of a winding can be connected in parallel, for example. The invention is not restricted to specific wiring variants. Thus, for example, the windings can be connected in the conventional manner, which means that each individual coil is wired by hand in the required way. In this case, the sub-coils of a winding can be connected in series, for example. The linking conductors, however, can be designed as connecting cables or connecting bars such as copper bars.

It is especially advantageous for the windings to be connected with the help of an interconnection arrangement such as that described in U.S. Pat. No. 6,364,473, the disclosure of which is incorporated herein by reference. This wiring arrangement has linking conductors which are electrically insulated with respect to each other, are arranged concentrically to each other, and have diameters which are different from each other. In addition, the linking conductors have connecting units for the ends of the individual stator coils of the winding and for connection with the electrical machine. These types of linking conductors, which are preferably in the form of rings, provide an interconnection arrangement which is also referred to as a "connecting ring".

It is preferable for each winding to have one or more coil units, each coil unit comprising three coils in particular. Each coil of each coil unit of a winding is assigned to a specific phase winding of the electrical machine, the coils assigned to a common phase winding being connected to each other. In the case of an electrical machine, a total of m phase windings is provided, which have a phase offset from each other 360/m in terms of the current supplied to them. If the coil unit has three coils and each coil is assigned to a specific phase winding, the electrical machine thus has three phase windings.

The individual coil units are preferably arranged on the stator component in such a way that a coil unit of one winding is always adjacent to a coil unit of a different winding on the stator component. This means that the coil units of the different windings always alternate with each other on the stator component.

In another design, the windings can be arranged radially on top of each other on the stator component. The radial direction here is the direction perpendicular to the rotational axis of the electrical machine, especially the rotor component. In the standard case, the winding of the electrical machine is carried on appropriate teeth. In the embodiment cited here, it is possible to arrange the winding on two levels, that is, two levels a certain distance apart from each other in the radial direction, on the same teeth. In this case, however, care must be taken to ensure that the individual windings are especially well insulated.

In yet another design, the separate windings can be arranged in their own separate segments of the stator component. This means that all the coils of a winding are combined together in a single segment of the stator component. If two electrical sub-machines are realized in the form of two separate windings on a ring-shaped stator component, each of the individual coils of the two windings can, for example, be arranged on a semicircle of the stator component. It is therefore impossible for the coils of the different windings to come in contact with each other. If there are more that two electrical sub-machines, the segments of the stator component available for the coils of the winding can be reduced in size accordingly.

It is advantageous to select the phase sequence of the individual windings in such a way that the electrical sub-machines rotate in the same direction of rotation.

In another design, the two or more electrical sub-machines can have the same number of pole pairs p and/or the number of coils, i.e., the number of slots ns. It is preferable for p and ns to be selected so that p/ns ratios of 7/6, 14/12, 21/18, etc., are obtained.

It is preferable for the two or more electrical sub-machines to have the same number of windings. This means that the individual sub-machines are designed for the same voltage. The number of windings can also be used to adapt the specific output, for example, to specific requirements.

It is advantageous for the two or more electrical sub-machines to have the same slot geometries and/or the same active lengths. This means that the individual sub-machines are designed for the same specific power.

It is preferable to provide two or more electronic power units. In particular, each winding can be connected to its own electronic power unit. The advantage of this is that the power of the electrical machine can be increased without having to change the shape of the plates (magnetic circuit) or the number of windings. In the standard case, the inductance in starter-generators with a large field weakening ratio is a limiting component in an electrical machine. Now, however, two or more electronic power units are provided, which control two or more electrical sub-machines. As a result, the power of the electrical machine is increased accordingly.

When, for example, two independent electrical sub-machines are provided on the stator component, an expert will find, on the basis of the preparation, evaluation, and comparison of the corresponding operating phasor diagrams for this situation in comparison with an electrical machine with only one winding on the stator component, that one of the two electrical sub-machines has the same torque as the machine with only one winding. Because the electrical machine according to the invention has two electrical sub-machines, however, it is therefore possible to double the torque and therefore also the output of the overall machine in comparison with the electrical machine with only one winding.

It is advantageous for the electronic power units to have the same power ranges. In another design, the electronic power units, however, can also have different power ranges. These different designs are described in greater detail below in conjunction with the electrical system according to the invention, so that reference is made here to the relevant discussion below.

It is preferable to provide one or more angle of rotation sensors for the one or more electronic power units. An angle of rotation angle sensor makes it possible to determine the precise position of the rotor. Exact knowledge of the angular position of the rotor is important so that the electrical machine can operate at optimum efficiency. One of the reasons for this is that electrical machines usually require a rectifier to obtain a three-phase supply from an intermediate circuit voltage. To produce the optimum torque for the electrical machine, the three-phase current must be impressed in such a way that maximum torque can develop. For this purpose, the rectifier must know the exact position of the rotor and thus the exact rotor displacement angle. Highly precise detection of the rotor position is thus a prerequisite for obtaining an electrical machine of high efficiency.

The angle of rotation sensor can be designed preferably as a resolver with a contour ring or the like. For the sake of redundancy, each electronic power unit can use its own sensor, which scans a common contour ring. As a result, the reliability of the electrical machine is increased even more. If it is decided to equip the electrical machine with a resolver, it is possible to provide several of them, one for each of the electronic power units.

If two electronic power units are provided, dual resolvers can be provided. It is also possible for the resolver to be designed with only partial duality; that is, it can have two separate receiver sides but only one excitation winding.

It is advantageous to provide coolant circulation for the one or more electronic power units. Multiple electronic power units in particular can be connected to a common coolant circuit. This makes it possible to cool the electronic power units easily.

Because it produces greater power, as described above, the electrical machine with two or more electrical sub-machines must also be cooled to a greater extent. If the electrical machine is built into a vehicle to serve as a starter-generator, for example, it can be cooled, for example, together with the internal combustion engine of the vehicle. When an electrical machine according to the invention is used, however, it is advantageous for it and especially for its electronic power unit(s) to be cooled by a separate coolant circuit.

In another embodiment, one or more devices can be provided to shut off the minimum of one electronic power unit, at least temporarily. As a result, it is possible, when necessary, to turn off one or more of the electronic power units when, for example, there is only a very small electrical load in the generator operating mode of the electrical machine designed as a starter-generator. When the machine is intended to start a warmed-up internal combustion engine, a single electronic power unit may be sufficient. Shut-off can be achieved in several different ways. For example, appropriate switch elements can be provided, but is it also conceivable that an active short-circuit could be produced. The invention is not limited to the examples mentioned.

According to a second aspect of the invention, an electrical system with an on-board network is provided, in which an electrical machine according to the invention as described above is provided. The electrical system has the advantages described in connection with the electrical machine, so that in this respect reference can be made to the entire content of the preceding description.

It is advantageous for each winding of the electrical machine to be connected to its own electronic power unit.

It is possible in this case for the electronic power units to have the same dimensions, so that the on-board network has sub-systems of the same voltage. It is preferable to use the electronic power units which are already used in large numbers in passenger vehicles, especially in the more expensive class of passenger vehicles. It is advantageous for the electronic power units to be controlled in such a way that, when the electrical machine is a starter-generator, both power circuits supply the same power to the on-board network when operating in generator mode. In starter mode, for example, or in motor mode or booster mode, etc., the power units will also be operated synchronously. When in such a case a power unit is to be turned off at least temporarily, a switch element such as that already described above can be installed, for example, between the internal combustion engine and the electronic power unit and/or between the power unit and the on-board network.

In another embodiment, the electronic power units can have different dimensions, so that the on-board network has sub-systems of different voltages. The point of having different voltages is so that special loads which require higher voltages or greater power can be supplied.

It is especially advantageous for an electrical machine such as that described above and/or an electrical system such as that described above to be installed in a motor vehicle, especially a passenger car and/or a commercial vehicle and/or a bus.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
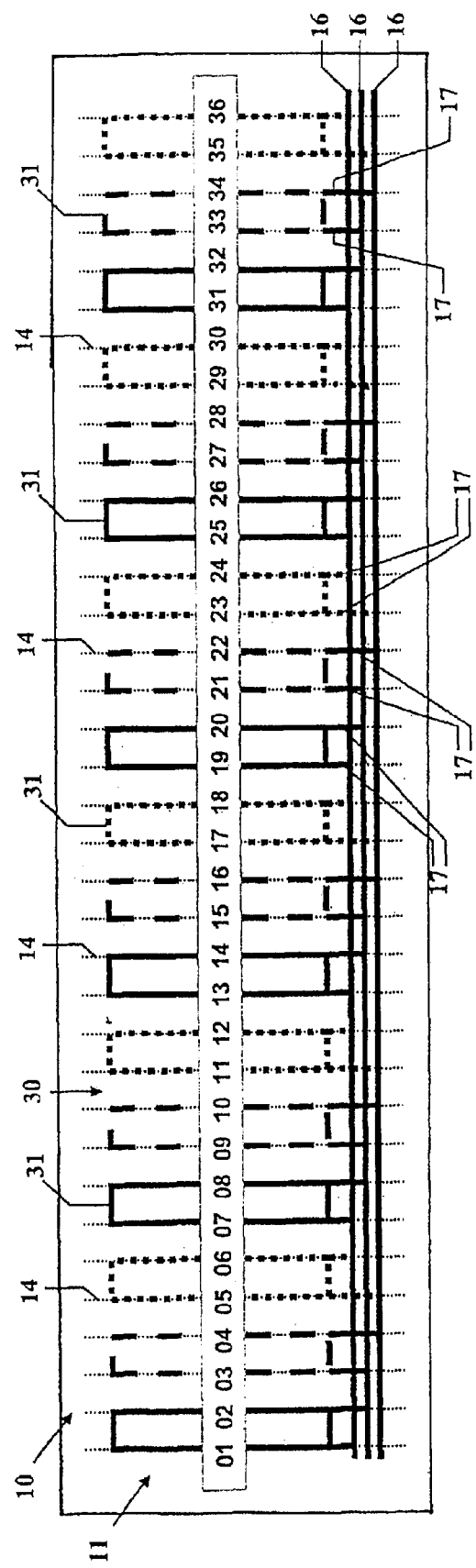
FIG. 1 is a schematic view of a winding diagram for an electrical machine known according to the state of the art.
Figure 2:
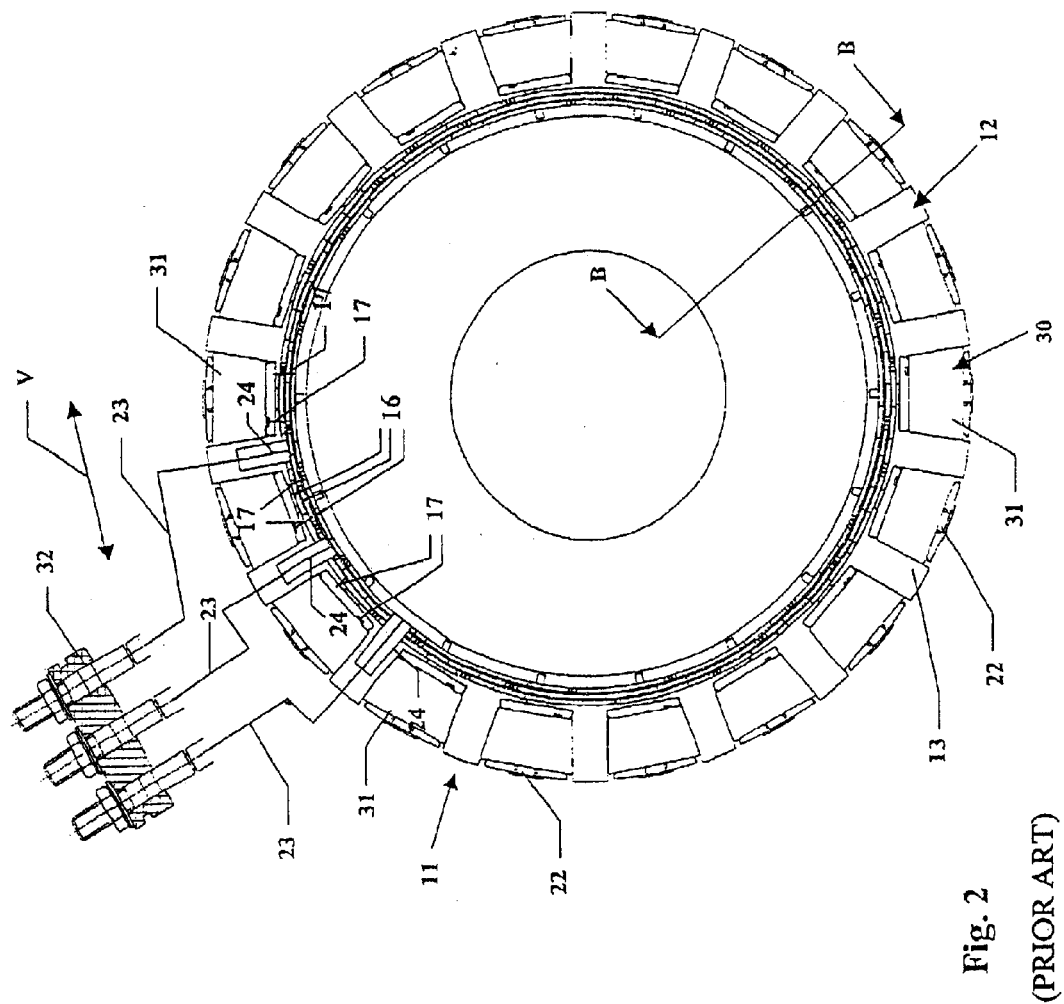
FIG. 2 is a plan view of the electrical machine known according to the state of the art shown in FIG. 1.
Figure 3:
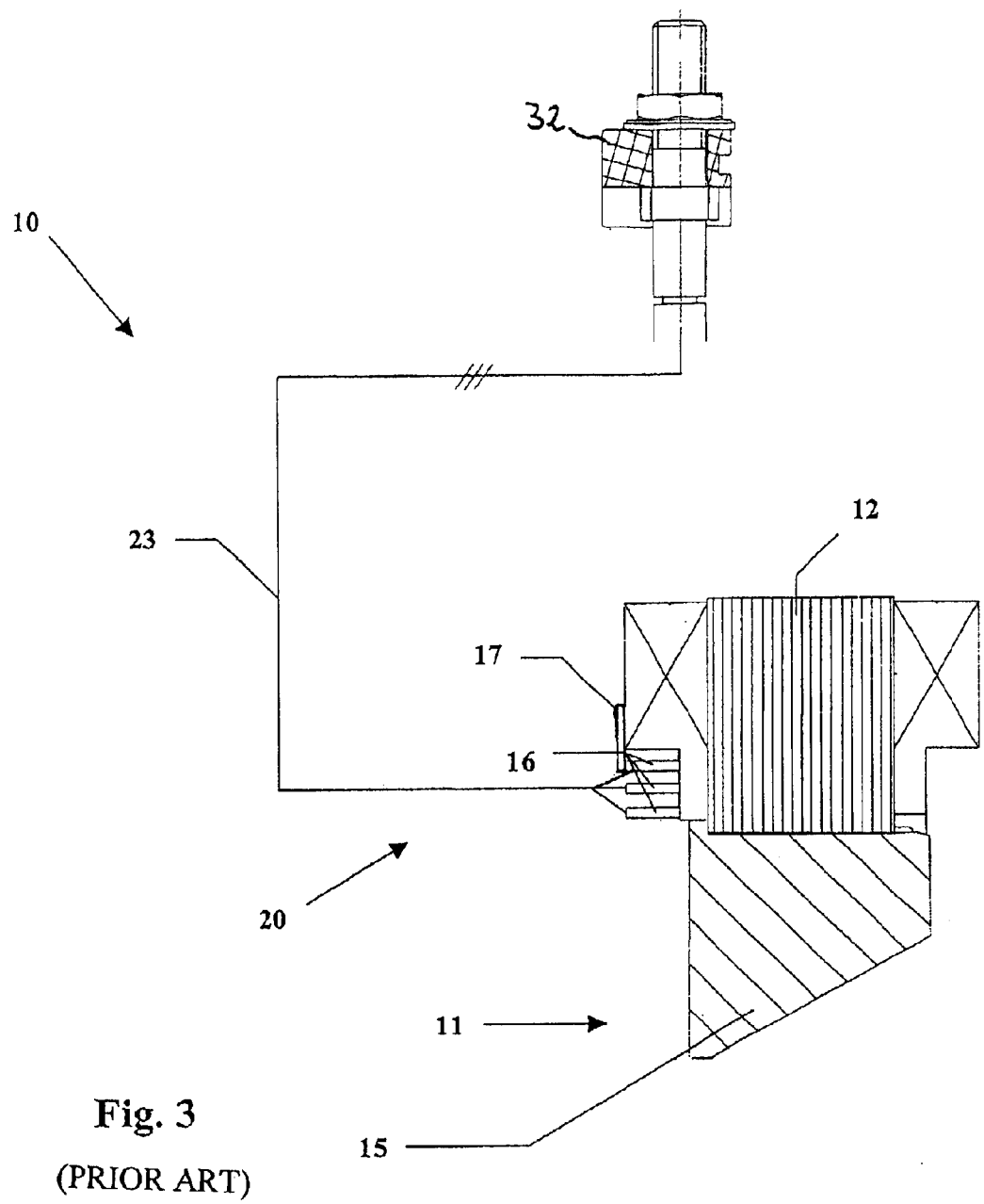
FIG. 3 is a partial, sectional, side view of the electrical machine known from the state of the art along line B—B of FIG. 2.

FIGS. 1–3 show an electrical machine 10 as known from the state of the art. The electrical machine 10 can be designed as a so-called starter-generator, the design and function of which have been explained in detail above as part of the general specification. The starter-generator can be installed in, for example, a motor vehicle such as a passenger car, a commercial vehicle, or a bus, etc. In the following, the solution known from the state of the art and the solution according to the invention are described on the basis of a starter-generator for a bus.

The electrical machine 10 according to FIGS. 1–3 has a stator component 11 and a rotor component (not shown). The stator component 11 is attached by way of a stator carrier 15 to an internal combustion engine (not shown). The stator component 11 also has, in a manner known in and of itself, a stack of plates 12 forming each tooth 13, on which a number of coils 31 are wound around teeth 13. The winding 30, in the form of the coils 31, is located in corresponding slots 14 in the stator component 11. FIG. 1 shows schematically a group of continuously numbered slots 14. In all, 36 of these slots 14 are provided for 18 coils. Of course, the number of slots 14 and thus also the number of coils 31 can be varied as needed depending on the concrete application. The coils 31 are wound on appropriate coil shells 22, which are attached in turn to the teeth. The coils 31 are assigned to individual phase windings, the coils 31 assigned to a common phase winding being connected to each other. In the present exemplary embodiment, a total of three phase windings is shown. The coils 31 of the first phase winding are characterized by continuous lines; the coils 31 of the second phase winding are characterized by broken line; and the coils 31 of the third phase winding are characterized by dotted line. Arrow V represents the torsion angle of the electrical machine 10.

An interconnection arrangement is provided to connect the individual coils 31 and thus the winding 30; this arrangement has three ring-shaped linking conductors 16, which are also called connecting rings. The individual coils 31 are connected by connecting terminals 17 in a suitable manner to the linking conductors 16.

The linking conductors 16 are connected in turn via appropriate connecting elements 24 and connecting leads 23 to a connecting unit 32. The connecting leads 23 can be designed as cables, copper bars, or the like.

As can be seen especially clearly in FIG. 3, the ring-shaped linking conductors 16 are located on one side 20 of the electrical machine 10. The components of the starter-generator 10, however, have only a limited life-span. Therefore, it is not impossible for individual components to fail during the extremely long useful life of a bus. Because only one starter-generator 10 is built into an internal combustion engine, the failure of the starter-generator 10 or of its electronic power unit would make it impossible to operate the bus any longer. Whereas the electronic power unit can be replaced as easily as a generator, this not the case with the starter-generator 10. This reason for this is that the starter-generator 10 is usually installed in the drive train of the bus between the engine and the clutch or transmission. It is therefore a very complicated and expensive job to replace the starter-generator 10.

To avoid these disadvantages, appropriately modified electrical machines 10 are proposed and described below.

Figure 4:
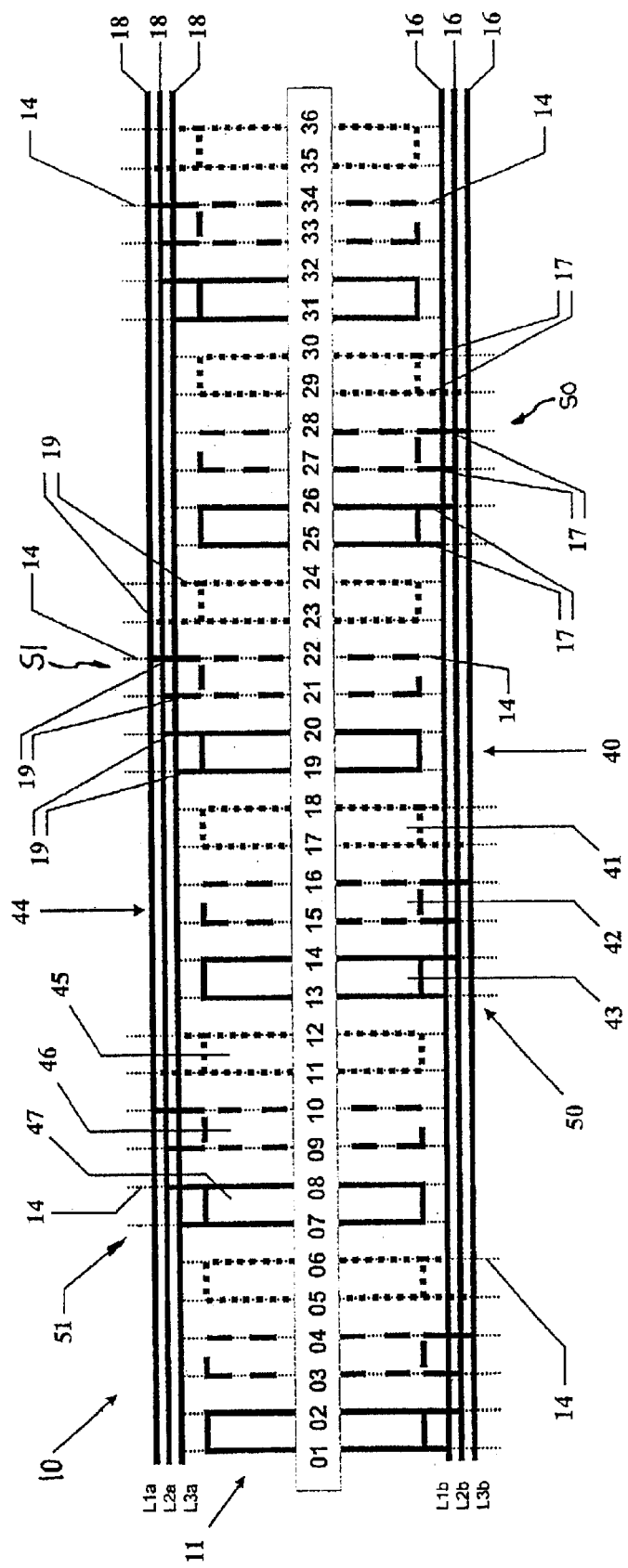
FIG. 4 is a schematic view of a winding diagram for an electrical machine according to the invention.

FIG. 4 shows a winding schematic for an electrical machine 10 according to the invention. This corresponds in its basic layout to the winding diagram shown in FIG. 1, so that the same structural elements have been given the same reference numbers. To avoid unnecessary repetition, reference is also made to the explanation of the basic design provided in conjunction with FIG. 1. Both design examples, i.e., that of FIG. 1 and that of FIG. 4, have the same number of slots 14; in the present case, each has 36 of them.

In contrast to the machine in FIG. 1, the electrical machine 10 shown in FIG. 4 now has two or more windings, which are carried independently of each other on the stator component 11. In FIG. 4, two windings 40, 44 are shown. Each winding 40, 44 has a number of coil units 50, 51, which are arranged adjacent to each other on the stator component 11.

Each coil unit 50 consists of three coils 41, 42, 43, and each coil unit 51 consists of three coils 45, 46, 47. The coils 41, 42, 43 of the coil units 50 are connected by connecting terminals 17 to linking conductors 16, and the linking conductors 16 are again designed in the form of rings to form an interconnection arrangement consisting of connecting rings. The coils 45, 46, 47 of the coil units 51 are connected by connecting terminals 19 to linking conductors 18, which are also designed in the form of rings and which form another wiring arrangement consisting of connecting rings.

The electrical machine 10 according to FIG. 4 is divided in practice into two or more sub-machines without requiring any additional space. For this purpose, the two or more separate windings 40, 44 are provided on the stator carrier 11. Each winding 40, 44 is connected, driven, and operated separately from the other. The electrical windings 40, 44 are therefore separated from each other electrically, so that each electrical winding 40, 44 and each electrical sub-machine based on one of these windings can be operated independently of the other windings or sub-machines. When one of the sub-machines fails, it is not necessary to replace the entire electrical machine 10, because the other sub-machines will take over the function of the failed sub-machine. The electrical machine 10 therefore has at least one redundant component.

Figure 5:
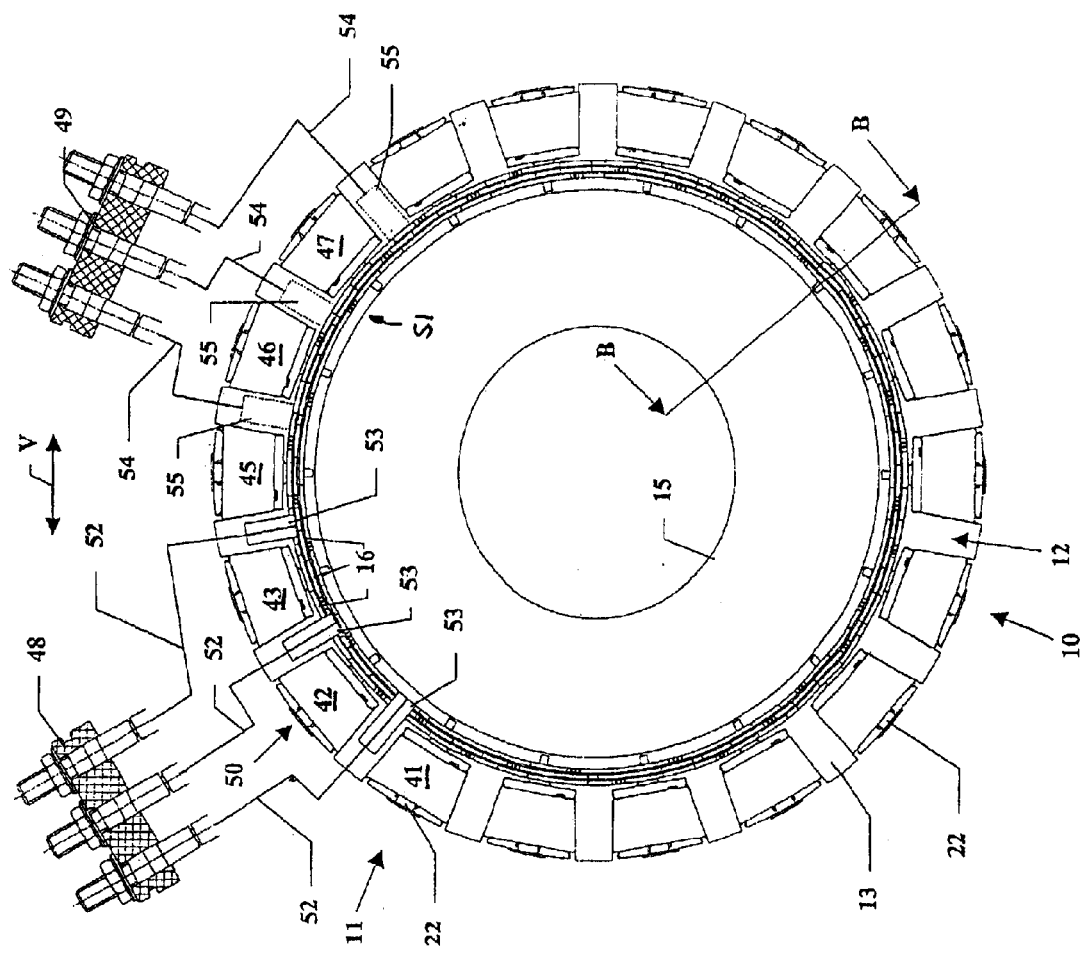
FIG. 5 is a plan view of another exemplary embodiment of an electrical machine according to the invention.
Figure 6:
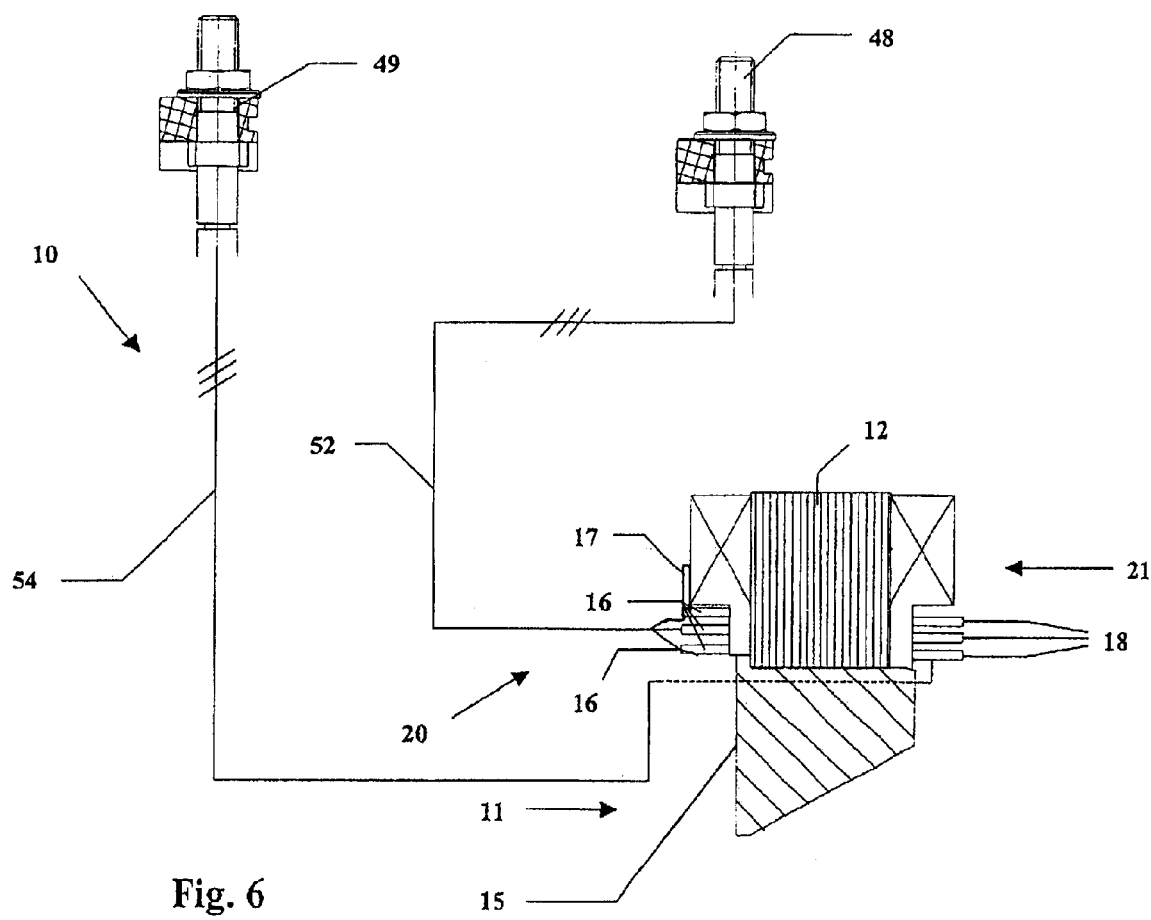
FIG. 6 is a partial, sectional, side view of the electrical machine along line B—B of FIG. 5.

FIGS. 5 and 6 show an exemplary embodiment of an electrical machine 10 according to the invention in which the basic principle described in conjunction with FIG. 4 is realized. The basic design of the electrical machine 10 is again the same as that of the electrical machine 10 shown in FIGS. 2 and 3, so that the same structural elements are again provided with the same reference numbers. To avoid unnecessary repetition, reference is therefore made to the explanations of FIGS. 2 and 3 with respect to the basic design and function of the machine.

In contrast to the machine of FIGS. 2 and 3, the electrical machine 10 according to FIGS. 5 and 6 has two or more—in the present case, two—windings 40, 44, each of which is formed by a number of coil units 50, 51. Each coil unit 50, 51 has three coils 41, 42, 43 and 45, 46, 47, respectively. The coil units of the two different windings are adjacent to each other on the stator component 11, which means that the coil units of the one winding alternate with the coil units of the other winding.

The coils 41, 42, 43 of the coil units 50 of winding 40 are connected by way of linking conductors 16 (connecting rings). For this purpose, the linking conductors 16 are connected by connecting terminals 53 and connecting leads 52 to a connecting unit 48. The linking conductors 16 and thus the connecting ring assembly formed from them are located on one side 20 of the stator component 11. The coils 45, 46, 47 of the coil units 51 of winding 44 are connected via linking conductors 18 (connecting rings) (see FIG. 4). For this purpose, the linking conductors 18 are connected via connecting terminals 55 and connecting leads 54 to a connecting unit 49. The linking conductors 18 and therefore the connecting ring assembly formed from them are located on the other side 21 of the stator component 11. Depending on the design, it is possible to combine the two connecting units 48, 49 into a single connecting unit.

In the embodiment shown in FIGS. 5 and 6, the two windings 40, 44 do not touch each other at any point. Therefore, this variant is especially reliable. The connecting leads 54 extending from the linking conductors 18 can be laid under the stator component 11, especially under the stator yoke 13, and thus brought through from side 21 to side 20. The individual connections of the linking conductors 16, 18 can also be "rotated" with respect to each other.

Figure 7:
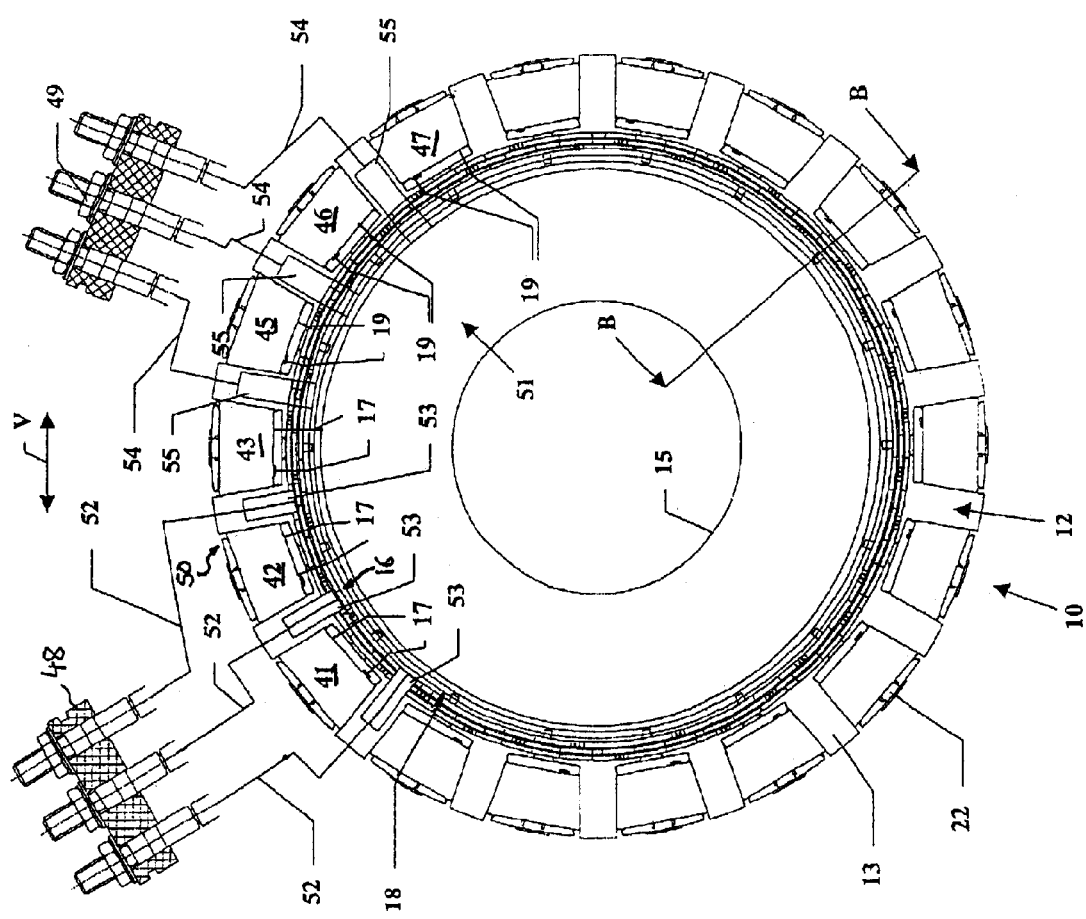
FIG. 7 is a plan view of yet another exemplary embodiment of an electrical machine according to the invention.
Figure 8:
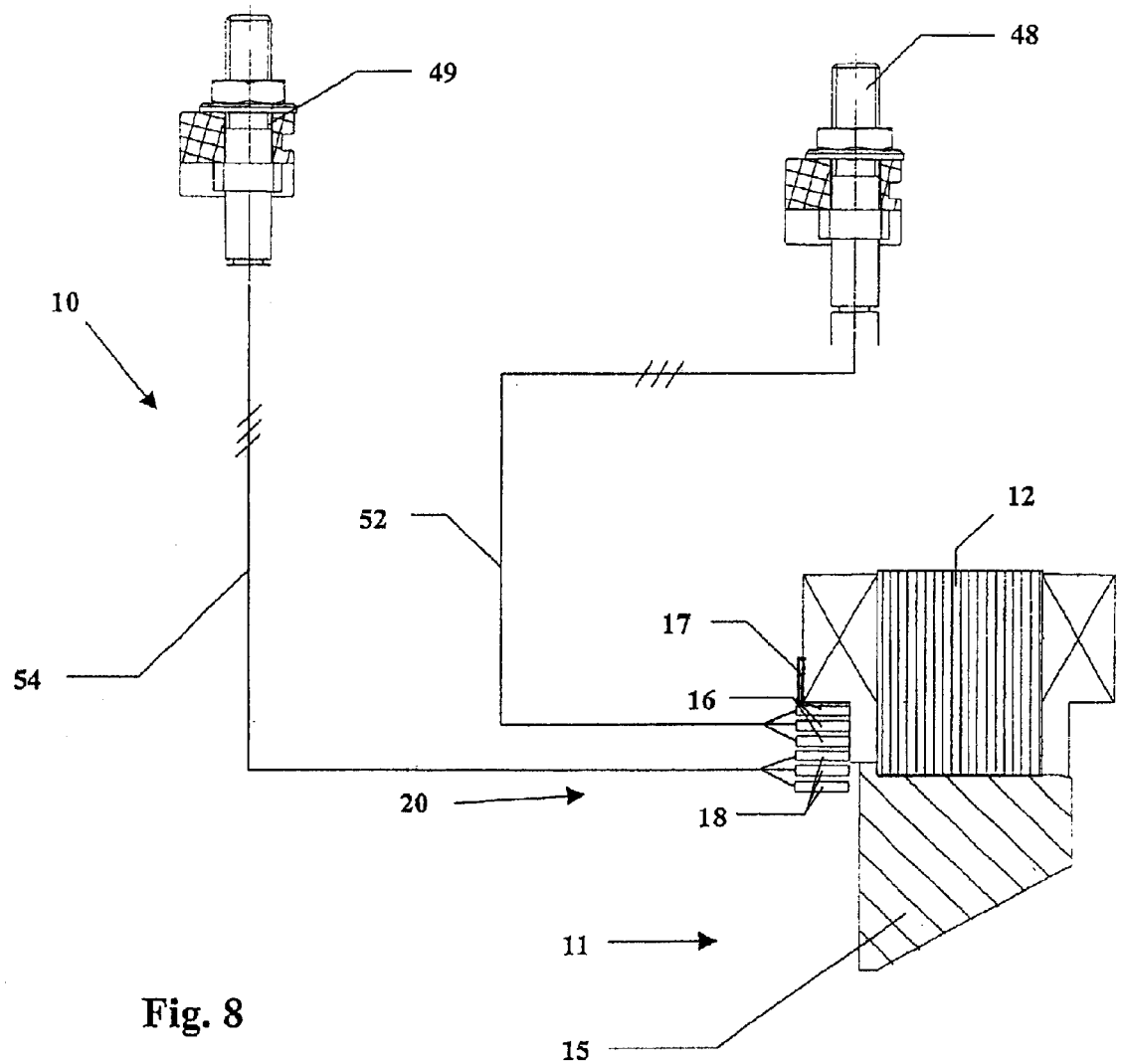
FIG. 8 is a partial, sectional, side view of the electrical machine along line B—B of FIG. 7.

FIGS. 7 and 8 show another exemplary embodiment of an electrical machine 10 according to the invention. This is the same with respect to its basic design and basic function as the electrical machine shown in FIGS. 2 and 3 and the machine in FIGS. 5 and 6, so that again the same structural elements are given the same reference numbers. To avoid unnecessary repetition, reference is made to the preceding explanations.

In the exemplary embodiment shown in FIGS. 7 and 8, the windings 40, 44 and the associated coils 41, 42, 43 and 45, 46, 47, respectively, of the coil units 50, 51 are separated as in FIGS. 5 and 6 and are connected independently of each other. This again is accomplished by way of ring-shaped linking conductors 16, 18, each of which forms an interconnection arrangement in the form of a connecting ring.

In contrast to the example shown in FIGS. 5 and 6, the linking conductors 16, 18 and thus the corresponding connecting rings are arranged next to each other in the radial direction, one on top of the other, on only one side 20 of the stator component 11.

The coils 41, 42, 43 are connected by connecting terminals 17 to the linking conductors 16, whereas the coils 45, 46, 47 are connected by the connecting terminals 19 to the linking conductors 18.

The winding diagram of the exemplary embodiment according to FIGS. 5 and 6 and that of the embodiment according to FIGS. 7 and 8 can be the same as that shown in FIG. 4. The winding diagram shown in FIG. 4 shows only the connecting in itself, so that the explicit position of the linking conductors plays no role there.

Figure 9:
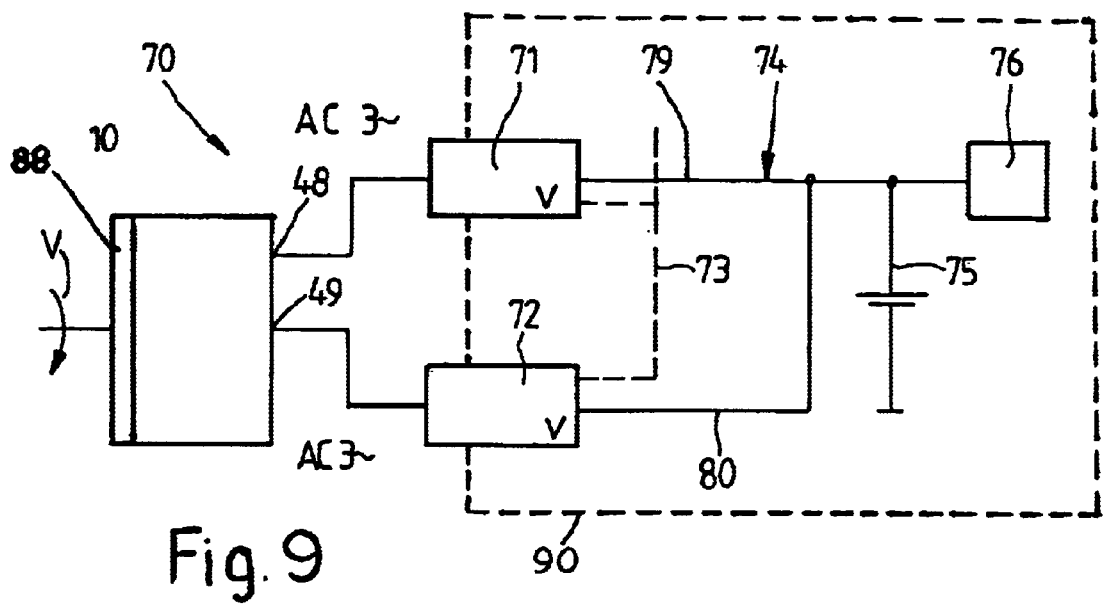
FIG. 9 is a schematic wiring diagram of a first embodiment of an electrical system according to the invention.
Figure 10:
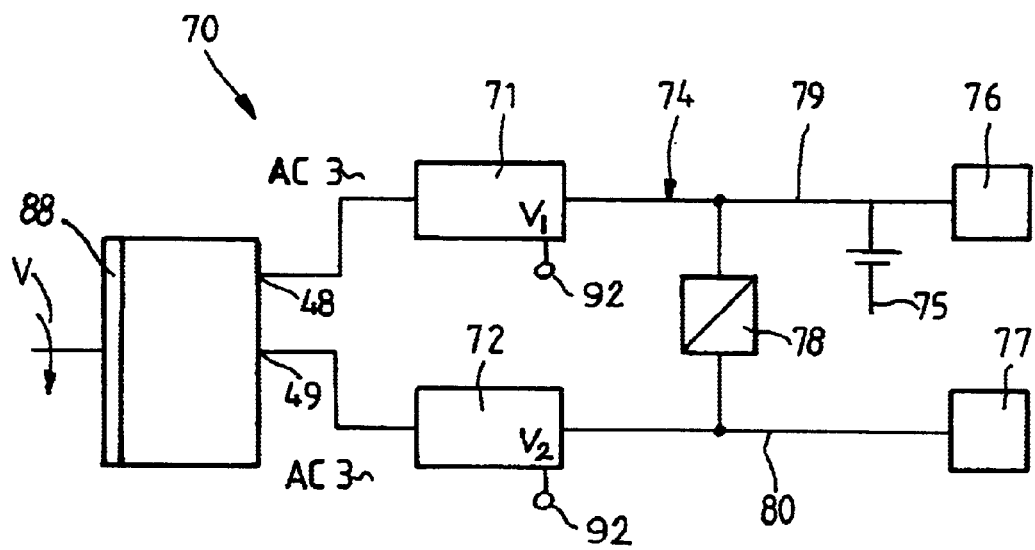
FIG. 10 is a schematic wiring diagram of another embodiment of an electrical system according to the invention.

FIGS. 9 and 10 show electrical systems 70, in which an electrical machine 10 according to the invention, such as a machine in the form of the previously described exemplary embodiments, is integrated. The electrical machine 10 is connected by the associated connecting units 48, 49 to the on-board network 74 of the electrical system 70.

In the two exemplary embodiments, it is provided that the electrical machine 10 carries two independent windings on the stator component and that each of the windings is connected by its own connecting unit 48, 49, respectively, to its own electronic power unit 71, 72. The electronic power units 71, 72 serve to control the electrical sub-machines formed in the electrical machine 10 by the independent windings. Each of the machines 10 has a rotational angle sensor 88 which determines the position of the rotor and provides this position to the electronic power units 71, 72.

In the case of the electrical system 70 shown in FIG. 9, the on-board network 74 is equipped with two electronic power units 71, 72 of the same power ranges, so that two sub-networks 79, 80 of the same voltage are created. It is preferable to use the electronic power units which are used in large numbers in luxury class automobiles. The two electronic power units 71, 72 are preferably driven in such a way that, in generator mode of the electrical machine 10, both electronic power units 71, 72 operate at the same voltage V and deliver the same power to the on-board network 74. For this purpose, they communicate over a CAN bus 73. In starter mode, the two electronic power units 71, 72 are also operated synchronously. The power can be retransmitted to appropriate loads 76. A battery 75, furthermore, is also provided in the on-board network 74, which can be charged, for example, by way of the electrical machine 10 when it is operating in generator mode.

A common coolant circuit 90 may be provided for circulating coolant to each of said electronic power units 71, 72.

When the electrical system 70 is operating, situations can occur in which there is no need for both electronic power units 71, 72. Examples might be that of a small electrical load in generator mode or, in engine-starting mode, the use of the electronic power unit to start an engine which is still hot, etc.

For this purpose, an electronic power unit 71, 72 can be turned off at least temporarily. It can be shut off in various ways. For example, it could be turned off by the use of appropriate switching elements 92. The switching elements can, for example, be installed between the electronic power unit and the internal combustion engine, between the electronic power unit and the on-board network, etc. It would also be possible actively to short-circuit the electronic power unit for a certain period of time.

The at least temporary shutting-off of an electronic power unit can also be realized in the electrical system 70 shown in FIG. 10. Although it has the same basic design as the system shown in FIG. 9, it differs in that the electronic power units 71, 72 have different power ranges, which means that sub-networks 79, 80 with different voltages are created. The different power ranges can be achieved by giving the electronic power unit 71 a certain number of MOSFET transistors, whereas the electronic power unit 72 has a certain number of IC-BT components.

The point of having different voltages is so that special loads designed for higher voltages/higher outputs can be supplied with the proper voltage. One might think here of on-board galleys in busses. One sub-network 79 is operated by a "standard" electronic power unit 71, which is designed for an on-board voltage $V_1$ of, for example, 14, 28, or 42 V. The second sub-network 80 is operated at a different voltage $V_2$, which is, for example, much higher than that of the on-board system voltage, e.g., up to as much as 400 V. For this purpose, the electronic power unit can be provided with 600-V IGBTs.

The two voltage levels or sub-networks 79, 80 are connected to each other by a transformer 78, in this case a DC—DC transformer. The electrical sub-machines created in the electrical machine 10 have different numbers of windings in this example.

Preferably high-power loads 77, especially those in the form of convenience loads, are supplied from the sub-network 80 with the higher voltage they require. One example of a load of this type would be the electric compressor of an air conditioner, etc. When the electrical system 70 is used in a truck, special equipment such as a crane, cleaning machines, etc. can be connected to the sub-network 80.

In the high-power sub-network 80, it is preferable for no battery 75 to be present. The sub-network 80 can also be operated, for example, as an AC/DC network.

In cases where the high-voltage sub-network 80 is designed for extremely high power, a preferably water-cooled load resistor (not shown) can be inserted into the load circuit. As a result, the electrical machine 10 can be used as a substitute for a retarder or at least can be used to reduce the size of the retarder. The load resistor can be connected by way of a switch element, a semiconductor, or the like. Under certain conditions, it may be possible to use a simple "chopper circuit" (PWM) to control braking power. In the case of an AC/DC network, it is possible, for example, to use a controlled bridge circuit, such as a so-called M3 circuit.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A starter-generator comprising
    a rotor component,
    a stator component comprising at least two separate windings, each of said windings comprising a plurality of coils and a plurality of linking conductors connecting the coils of the respective winding, thereby forming at least two electrical sub-machines, all of the coils of being arranged in a single ring, the coils of each said winding being arranged in circumferential series with the coils of each other said winding, and
    at least one electronic power unit for controlling said electrical sub-machines.

2. A starter-generator as in claim 1 wherein said stator component has a pair of axially opposed sides, said coils of each said winding being connected on the same axial side of the stator component.

3. A starter-generator as in claim 1 wherein said stator component has a pair of axially opposed sides, the coils of one of said windings being connected to linking conductors on one axial side, the coils of another said winding being connected to linking conductors on the opposed axial side.

4. A starter-generator as in claim 1 wherein each of said windings comprises a plurality of connections, said machine further comprising a separate connecting unit for the connections of each said winding.

5. A starter-generator as in claim 1 wherein the linking conductors are in the form of rings.

6. A starter-generator as in claim 5 wherein said linking conductors of one of said windings are arranged radially on top of the linking conduct of the other winding.

7. A starter-generator as in claim 1 wherein each of said windings comprises a plurality of coil units, each of said coil units comprising three of said coils.

8. A starter-generator as in claim 7 wherein the coil units of one winding alternate circumferentially with the coil units of the other winding on the ring.

9. A starter-generator as in claim 1 wherein all of the coils of each said winding are arranged continuously.

10. A starter-generator as in claim 1 wherein each said winding has a phase sequence, the phase sequences of the respective windings being selected so that the electrical sub-machines rotate in the same direction.

11. A starter-generator as in claim 1 wherein each of said sub-machines has at least one of the same number of pole pairs and the same number of coils.

12. A starter-generator as in claim 1 wherein each of said sub-machines has the same number of windings.

13. A starter-generator as in claim 1 wherein each of said sub-machines has a slot geometry and an active length, at least one of said slot geometries and said active lengths of said sub-machines being the same.

14. A starter-generator as in claim 1 further comprising at least two electronic power units, said windings being connected to said electronic power units.

15. A starter-generator as in claim 14 wherein each of said windings is connected to a respective said electronic power unit.

16. A starter-generator as in claim 14 wherein said electronic power units have the same power ranges.

17. A starter-generator as in claim 14 wherein said electronic power units have different power ranges.

18. A starter-generator as in claim 1 further comprising at least one rotational angle sensor for detecting the angular position of the rotor and providing said angular position to said at least one electronic power unit.

19. A starter-generator as in claim 1 further comprising a common coolant circuit for circulating coolant to each of said electronic power units.

20. A starter-generator as in claim 1 further comprising means for at least temporarily turning off each said at least one electronic power unit.

21. An electrical system machine as in claim 1 wherein said stator component comprises a stator carrier having a plurality of radially extending teeth, said coils being arranged on respective said teeth.

22. An electrical system with an on-board network comprising a starter generator, said starter generator comprising a stator component comprising at least two separate windings, each of said windings comprising a plurality of coils and a plurality of linking conductors connecting the coils of the respective winding, thereby forming at least two electrical sub-machines, all of the coils being arranged in a single ring, the coils of each said winding being arranged in circumferential series with the coils of each other said winding, and at least one electronic power unit for controlling said electrical sub-machines.

23. An electrical system as in claim 22 wherein each said winding is connected to a respective said electronic power unit.

24. An electrical system as in claim 23, wherein each of said electronic power units has the same power range, so that the on-board network has sub-networks of the same voltage.

25. An electrical system as in claim 23 wherein each of said electronic power units has a different power range, so that the on-board network has sub-networks of different voltages.

26. An electrical system as in claim 22 wherein said stator component comprises a stator carrier having a plurality of radially extending teeth, said coils being arranged on respective said teeth.

* * * * *